W. H. P. CREIGHTON.
MEANS FOR CONTROLLING THE LEVEL OF LIQUIDS IN EVAPORATING APPARATUS.
APPLICATION FILED DEC. 31, 1920.
1,419,824.
Patented June 13, 1922.
2 SHEETS—SHEET 1.
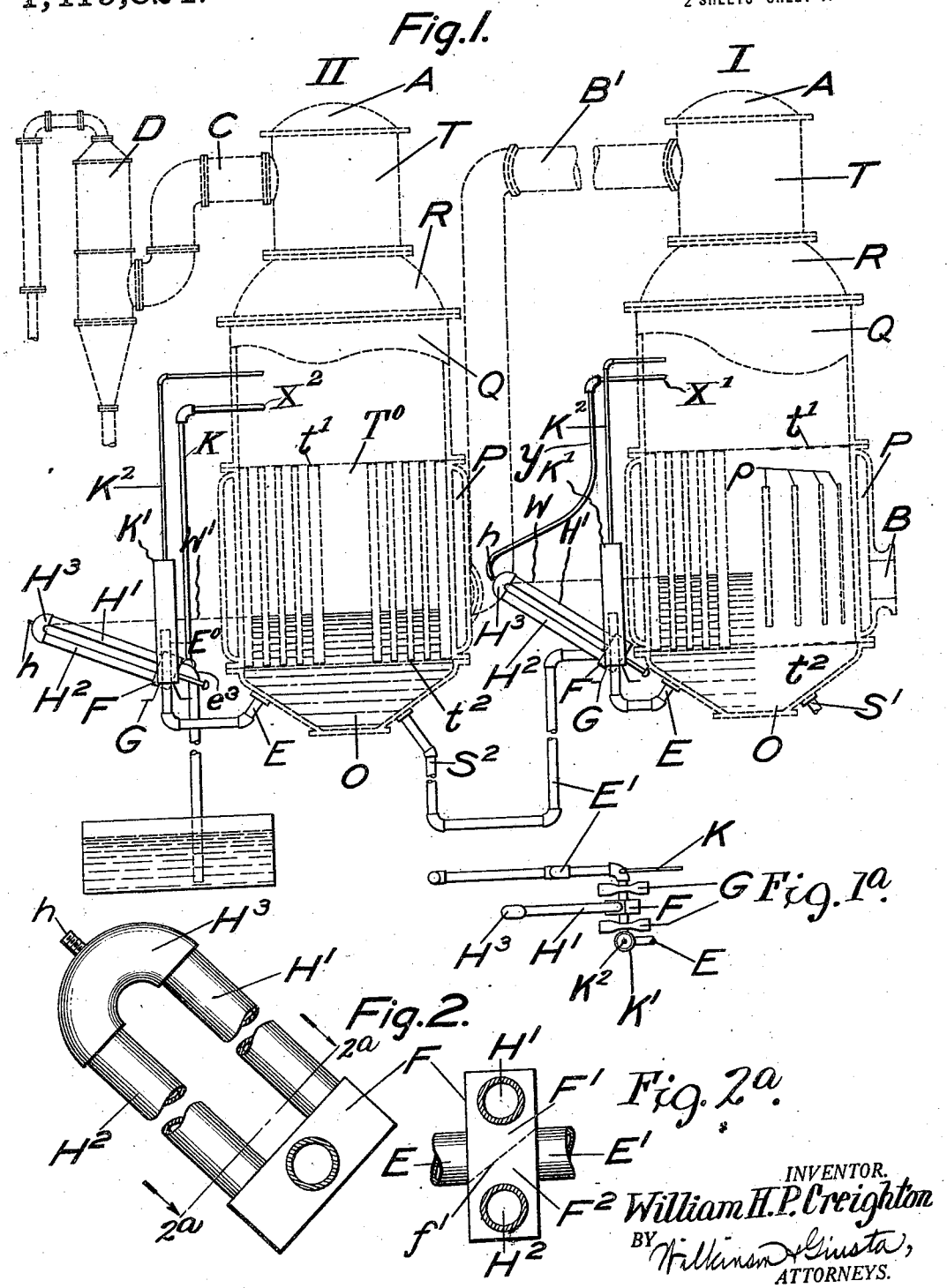
INVENTOR.
William H. P. Creighton
BY Wilkinson & Ginsta,
ATTORNEYS.

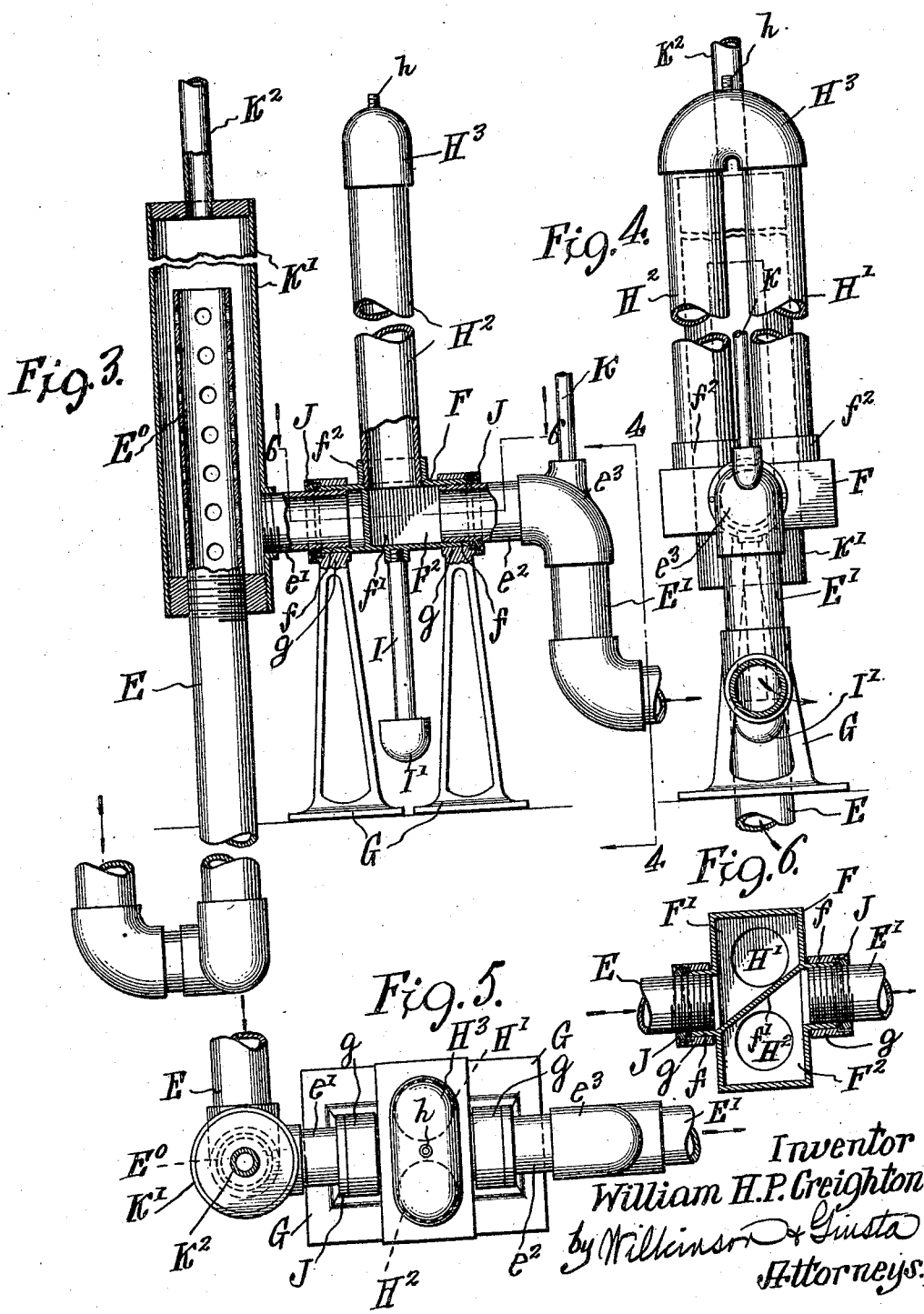

UNITED STATES PATENT OFFICE.

WILLIAM H. P. CREIGHTON, OF NEW ORLEANS, LOUISIANA.

MEANS FOR CONTROLLING THE LEVEL OF LIQUIDS IN EVAPORATING APPARATUS.

1,419,824.

Specification of Letters Patent. Patented June 13, 1922.

Application filed December 31, 1920. Serial No. 434,367.

*To all whom it may concern:*

Be it known that I, WILLIAM H. P. CREIGHTON, a citizen of the United States, residing at New Orleans, in the parish of Orleans and State of Louisiana, have invented certain new and useful Improvements in Means for Controlling the Level of Liquids in Evaporating Apparatus; and I do hereby declare the following to be a full, clear, and exact description of the invention, such as will enable others skilled in the art to which it appertains to make and use the same.

The density of sugar juices and other liquids is increased by successive boiling, usually at pressures less than that of the atmosphere, in a series of effects or heaters called, when spoken of as a unit, a multiple effect.

In a multiple effect the first effect is supplied with steam from an external source, usually the exhaust from the main engines. Economy is attained by using the steam rising from the boiling liquid in one effect as the heating agent in the next effect. That rising from the last effect is sent to the condenser.

In multiple effects as used in the evaporation of saccharine solutions, such as are employed in the manufacture of sugar from cane or beets, the evaporation takes place in a partial vacuum, and the various evaporators are connected together so that the liquid is conveyed progressively from one evaporator to another until the requisite degree of concentration of the juice has been secured, when the resultant product is carried off in the usual way for the final treatment in the vacuum pan.

The pressure on the liquid surface of the first vessel is higher than that on the liquid surface of the next or second vessel, and that latter pressure is higher than the pressure on the liquid surface of the next vessel. This difference of pressure between adjoining vessels is necessary to cause heat transfer and furnishes the force to make the liquid pass from one effect to the next. The liquid has its density increased in each effect by the evaporation of a portion of its water content and is pumped from the last vessel or flows into a tank at a suitable elevation.

This tendency of the liquid to pile up towards the finishing end of the apparatus has been hitherto controlled by a suitable throttle valve arrangement operated by hand between the successive effects, which requires careful attention of the sugar boiler not only in manipulating the valves, but also in keeping note of the height of the liquid indicated in the glass gages provided for this purpose.

According to my invention I purpose to do away with this hand-controlled flow of the liquid, and also with the necessity of noting the height of the liquid in the glass gages, by providing an automatic control whereby the height of the liquid may be automatically regulated in the various effects of the series.

To accomplish these results I provide the apparatus shown in the accompanying drawings, in which like parts are indicated by similar reference symbols throughout the several views, and in which:—

Figure 1 shows in dotted lines a double effect with my improved apparatus applied thereto, and shown diagrammatically in full lines.

Figure 1ª is a diagram showing in plan one of the level controllers.

Figure 2 is a detail showing diagrammatically and on a larger scale one of the level controllers detached from the rest of the apparatus, parts being broken away.

Figure 2ª shows a section along the line 2ª—2ª of Figure 2, and looking in the direction of the arrows.

Figure 3 is a side elevation on a larger scale of the controllers showing the trunnioned elbow joints in section, with the pipe connections for same used in my invention, parts being broken away.

Figure 4 shows a section along the line 4—4 of Figure 3, and looking in the direction of the arrows, parts being broken away, parts being shown in elevation;

Figure 5 is a plan view of the device shown in Figures 3 and 4; and

Figure 6 shows a section along the line 6—6 of Figure 3, and looking in the direction of the arrows.

Referring first to Figure 1, this shows in dotted lines two effects I and II of the usual well known construction.

Each effect is divided into belts, the lowest is the bottom belt O, above it is the steam belt P, and above it are the vapor, dome, and top belts Q, R and T, respectively.

Following the usual practice, the steam belt is bounded above and below, respectively, by the tube sheets $t'$ and $t^2$, into which are expanded the ends of numerous small tubes and one large central downcomer T⁰, and laterally by a hollow annular belt P, whose inner wall contains slots $p$ shown in the first effect I; some of the tubes being omitted to show the parts behind.

Steam enters by the pipe B, passes around the steam belt and enters the space around the tubes through the ports or slots $p$. The condensation of the steam in the intertubular space furnishes the heat to vaporize the liquid contained in the tubes, which is at a lower pressure than the heating fluid.

The object of this invention is to control the passage from one effect to the next (automatically, and independent of any change in the steam pressure in the first or other effects or of the liquid feed to the first effect), so that no liquid will pass from one effect to the next unless the liquid in the former vessel is at a required height and further to prevent this height being exceeded by more than an immaterial quantity by providing an adequate overflow from the former into the latter. In the case of the last effect the overflow is into a tank placed at a proper height or is pumped out.

In Figure 1 the controller, comprising the invention, is shown in connection with two standard vertical effects, although its use is not limited to that type. The effects are shown in dotted lines. Between them in full lines is a side elevation of one controller; and below the condenser D is a side elevation of another controller. The two controller arms are intentionally placed at different angles to show the method of controlling liquid levels W and W', although such difference of level is not necessary.

The controller shown in detail in Figures 3 to 6 comprises an overflow chamber H³, or locus of overflow, into which are tightly fitted two hollow controller arms or tubes H' and H², which are screwed into or otherwise tightly fitted to flanges on the junction box F, which can be rotated on trunnions $f$, in bearings $g$, carried by frames G; a tight joint being assured by any suitable gland or stuffing box J.

The junction box F is divided into two parts F', for the incoming, and F² for the outgoing fluid, as shown in Figure 6.

The overflow chamber H³ and the controller arms H' and H², and the junction box F form a rigid arm that may be rotated by hand about an axis indicated by the arrows in Figure 6, thus varying the vertical height or altitude of the overflow chamber H³, relative to the liquid level in the effect. The controller may be more or less permanently fixed in any of its positions by friction, or an adequate counterweight I' may be provided, or any other convenient way of locking the controller at the desired tilt may be adopted.

The liquid leaving an effect by piping E, enters a foaming chamber K' through a perforated pipe E⁰, open at the top. Any steam bubbles formed in the liquid, due to the reduction of pressure, will rise vertically in the pipe E⁰, escape through the open top and pass by the pipe K², to the vapor belt from which the juice came. The liquid deprived of its vapor passes from K' into pipe section $e'$, and enters the section F' of the junction box, shown in Fig. 6, and rises in the controller arm H' to an altitude practically equivalent to the altitude of the liquid in the effect. This altitude is generally shown by the glass gage exterior to the effect, generally used with such apparatus and not shown herein.

This height in H' will follow the well known principle that if two hollow vessels are connected by a tube, the height of a liquid in each will be the same if the pressures on the liquid surfaces are the same.

It will be noted that:

(1) If the level set by the controller or the altitude of the bottom of the overflow chamber H³ is higher than the liquid level in the effect there will be no overflow of the liquid from the arm H' into the arm H², as it will not rise high enough in the arm H' to overflow.

(2) If the liquid fed into an effect tends to raise its liquid level above that for which its controller is set, then adequate overflow will occur, and increasing height constrained. The overflowing liquid will run down the inclined tube H², with increasing velocity, and will not fill the cross section of that tube, thus ensuring the same vapor pressure in H³, H² and all connections to the upper part of the pipe E'.

It is essential to prevent siphoning that the pressure of the vapor in the overflow chamber H³ shall be the same as in the vapor belt Q, of the effect from which the liquid is coming. This can be secured by connecting the nipple $h$ on H³ with any point in the vapor belt Q, Fig. 1, I, by a flexible steam hose $y$, or preferably by connecting the elbow $e³$ with a point X² in the vapor belt Q, Fig. 1, II, by a pipe, such as K, see Figures 1 and 3.

It will be noted that the leg E' S² is in the form of a U bend, in which the vapor pressure on the liquid surface in E' is higher than that on the liquid surface in II, Fig. 1, as it sustains not only that pressure but also that due to the pressure due to the liquid in the leg S², when completely filled. After equilibrium is established, any liquid flowing into E' and raising the liquid level therein will be followed by a flow of liquid into the effect fed by S² and by a consequent lowering of the level in E' until equilibrium is established. Hence any liquid overflowing into H² will go to the next effect.

It will be seen that once the controller on each effect is set for the desired level, no more attention is required, whether the mill stops or changes in speed, or whether the steam pressure or juice feed alters; for the controller is maintaining the best possible conditions in each effect.

No valves are required in the herein described controller arrangement, and if there are any valves on the feed lines they should be left wide open in so far as regulating the liquid levels is concerned.

I have shown one embodiment of the invention in which the controller is caused to tilt about hollow trunnions through which trunnions the liquid passes, but I do not intend to limit the invention to any such specific arrangement as the details of construction and the combination and arrangement of parts may be largely varied without departing from the spirit of my invention where it will stand at a height determined by the difference in pressure between chambers I and II.

Having thus described my invention what I claim and desire to secure by Letters Patent of the United States is:—

1. In apparatus of the character described, means for controlling the height of a liquid in a heater comprising a liquid delivery line, an overflow chamber in said liquid delivery line, means for maintaining on the overflowing liquid in said chamber the steam pressure as that on the liquid surface of the heater, and means for adjusting the height of the overflow point of said overflow chamber by revolving it in an arc of a circle in a vertical plane.

2. In apparatus of the character described, means for controlling the height of a liquid in a heater comprising a liquid delivery line, an overflow chamber in said liquid delivery line, means for maintaining on the overflowing liquid in said chamber the same steam pressure as that on the liquid surface of the heater and means for adjusting the height of the overflow point of said overflow chamber by revolving it in an arc of a circle in a vertical plane, the radius of the circle being a possibly desired total variation in the altitude of desired surface levels in the heater.

3. In apparatus of the character described, the combination with a heater, provided with a liquid delivery line, an overflow chamber included in said line, means for keeping the steam pressure in said chamber the same as that on the liquid surface in the heater from which the liquid is flowing, a trunnioned junction box included in said liquid delivery line, and pipes connecting the overflow chamber and junction box, said junction box, pipes and overflow chamber forming a controller capable of revolving about the axis of the trunnions for the purpose of altering the altitude of the overflow chamber and so regulating the altitude of the liquid level in the heater.

4. In a system for progressively evaporating liquids in closed vessels, having different internal steam pressures, said vessels being connected together seriatim by liquid delivery lines, means for controlling the height of liquid in any one vessel, comprising a trunnioned junction box mounted in the delivery line from said vessel, a pair of pipes leading from said junction box, an overflow chamber connected to the outer ends of said pipes and forming therewith a U-shaped controller, means for setting said controller at any desired tilt, and means for equalizing the pressure in said overflow chamber with that of the vessel supplying liquid to said chamber.

5. In a system for progressively evaporating liquids in closed vessels, having different internal steam pressures, said vessels being connected together seriatim by liquid delivery lines, means for controlling the height of liquid in any one vessel, comprising a trunnioned junction box mounted in the delivery line from said vessel, a pair of pipes leading from said junction box, an overflow chamber connected to the outer ends of said pipes and forming therewith a U-shaped controller, means for setting said controller at any desired tilt, and means for equalizing the pressure in said overflow chamber with that of the vessel supplying liquid to said chamber, said means comprising a pipe connecting the steam space of said vessel with said controller.

6. In a system for progressively evaporating liquids in closed vessels, having different internal steam pressures, said vessels being connected together seriatim by liquid delivery lines, means for controlling the height of liquid in any one vessel, comprising a trunnioned junction box mounted in the delivery line from said vessel, a pair of pipes leading from said junction box, an overflow chamber connected to the outer ends of said pipes and forming therewith a U-shaped controller, means for setting said controller at any desired tilt, an arm connected to said trunnion junction box opposite said pipes, a counterweight carried by said arm, and means for equalizing the pressure in said overflow chamber with that of the vessel supplying liquid to said chamber.

7. In a system for progressively evaporating liquids in closed vessels, having different internal steam pressures, said vessels being connected together seriatim by liquid delivery lines, means for controlling the height of liquid in any one vessel, comprising a trunnioned junction box mounted in the delivery line from said vessel, a pair of pipes leading from said junction box, an overflow chamber connected to the outer ends of said pipes and forming therewith a U-shaped controller, means for setting said controller at any desired tilt, an arm connected to said trunnion junction box opposite said pipes, a counterweight carried by said arm, and means for equalizing the pressure in said overflow chamber with that of the vessel supplying liquid to said chamber, said means comprising a pipe connecting the steam space of said vessel with said controller.

8. In apparatus of the character described, means for controlling the height of a liquid in a heater comprising a liquid delivery line, an overflow chamber in said liquid delivery line, means for maintaining on the overflowing liquid in said chamber the same steam pressure as that on the liquid surface of its heater, and adjusting the height of the overflow point of said overflow chamber by revolving it in an arc of a circle in a vertical plane, with means provided in said delivery line for separating the foam from the denser liquid.

9. In apparatus of the character described, means for controlling the height of a liquid in a heater comprising a liquid delivery line, an overflow chamber in said liquid delivery line, means for maintaining on the overflowing liquid in said chamber the same steam pressure as that on the liquid surface of its heater and adjusting the height of the overflow point of said overflow chamber by revolving it in an arc of a circle in a vertical plane, the radius of the circle being a possibly desired total variation in the altitude of desired surface levels in the heater, with means provided in said delivery line for separating the foam from the denser liquid.

10. In apparatus of the character described, the combination with a heater, provided with a liquid delivery line, an overflow chamber included in said line, means for keeping the steam pressure in said chamber the same as that on the liquid surface in the heater from which the liquid is flowing, a trunnioned junction box included in said liquid delivery line, and pipes connecting the overflow chamber and junction box, said junction box, pipes and overflow chamber forming a controller capable of revolving about the axis of the trunnions for the purpose of altering the altitude of the overflow chamber and so regulating the altitude of the liquid level in the heater, with means provided in said delivery line for separating the foam from the denser liquid.

11. In a system for progressively evaporating liquids in closed vessels, having different internal steam pressures, said vessels being connected together seriatim by liquid delivery lines, means for controlling the height of liquid in any one vessel, comprising a trunnioned junction box mounted in the delivery line from said vessel, a pair of pipes leading from said junction box, an overflow chamber connected to the outer ends of said pipes and forming therewith a U-shaped controller, means for setting said controller at any desired tilt, and means for equalizing the pressure in said overflow chamber with that of the vessel supplying liquid to said chamber, with means provided in said delivery line for separating the foam from the denser liquid.

WILLIAM H. P. CREIGHTON.